United States Patent
Nochi et al.

(10) Patent No.: US 8,288,309 B2
(45) Date of Patent: Oct. 16, 2012

(54) MERCURY OXIDATION CATALYST AND METHOD FOR PRODUCING THE SAME

(75) Inventors: Katsumi Nochi, Hiroshima (JP);
Masanao Yonemura, Hiroshima (JP);
Masashi Kiyosawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/895,194

(22) Filed: Sep. 30, 2010

(65) Prior Publication Data

US 2011/0082028 A1 Apr. 7, 2011

Related U.S. Application Data

(60) Provisional application No. 61/247,716, filed on Oct. 1, 2009.

(51) Int. Cl.
| | |
|---|---|
| *B01J 23/00* | (2006.01) |
| *B01J 8/02* | (2006.01) |
| *C01G 9/00* | (2006.01) |
| *C01G 11/00* | (2006.01) |
| *C01G 11/02* | (2006.01) |
| *C01G 13/00* | (2006.01) |
| *C01G 13/02* | (2006.01) |
| *C01G 17/00* | (2006.01) |
| *C01G 19/00* | (2006.01) |
| *C01G 19/04* | (2006.01) |
| *C01G 28/00* | (2006.01) |
| *C01G 30/00* | (2006.01) |
| *C01G 43/00* | (2006.01) |
| *B01D 53/56* | (2006.01) |
| *B01D 53/94* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |

(52) U.S. Cl. ........ 502/312; 502/307; 502/309; 502/313; 502/315; 502/316; 502/318; 502/350; 502/353; 423/99; 423/107; 423/213.2; 423/594.18

(58) Field of Classification Search .............. 502/307, 502/309, 312, 313, 315, 316, 318, 350, 353; 423/99, 107, 213.2, 594.18
See application file for complete search history.

(56) References Cited

U.S. PATENT DOCUMENTS 5,221,484 A * 6/1993 Goldsmith et al. ........... 210/650
(Continued)

FOREIGN PATENT DOCUMENTS
JP 2583911 B2 2/1997
(Continued)

OTHER PUBLICATIONS

"Oxidation and capture of elemental mercury over SiO2-TiO2-V2O5 catalysts in simulated low-rank coal combustion flue gas," Hailong Li et al. Chemical Engineering Journal 169 (2011), pp. 186-193.*

(Continued)

*Primary Examiner* — Patricia L Hailey
(74) *Attorney, Agent, or Firm* — Westerman, Hattori, Daniels & Adrian, LLP

(57) ABSTRACT

A highly durable mercury oxidation catalyst contains $V_2O_5$ and $MoO_3$ as active components, and is capable of preventing volatilization of $MoO_3$ in the mercury oxidation catalyst. A method of producing the mercury oxidation catalyst is provided. A mercury oxidation catalyst oxidizing mercury in an exhaust gas into mercury oxide includes: $TiO_2$ as a carrier, $V_2O_5$ and $MoO_3$ supported on the carrier as active components, and at least one kind of element or compound selected from the group consisting of W, Cu, Co, Ni, and Zn or the compounds thereof supported on the carrier as a $MoO_3$ volatilization preventing component.

4 Claims, 3 Drawing Sheets

U.S. PATENT DOCUMENTS

| | | |
|---|---|---|
| 6,638,485 B1 | 10/2003 | Iida et al. |
| 2003/0170159 A1 | 9/2003 | Honjo et al. |
| 2005/0112044 A1 | 5/2005 | Kuma et al. |

FOREIGN PATENT DOCUMENTS

| | | | |
|---|---|---|---|
| JP | 9-099239 A | | 4/1997 |
| JP | 2651981 B2 | | 9/1997 |
| JP | 10-230137 A | | 9/1998 |
| JP | 2991431 B2 | | 12/1999 |
| JP | 3270084 B2 | | 4/2002 |
| JP | 3310926 B2 | | 8/2002 |
| JP | 2003-053142 | * | 2/2003 |
| JP | 2003-053142 A | | 2/2003 |
| JP | 2004-237244 A | | 8/2004 |
| JP | 2005-125213 A | | 5/2005 |
| JP | 3924418 B2 | | 6/2007 |
| JP | 3935547 B2 | | 6/2007 |
| JP | 4113090 B2 | | 7/2008 |
| WO | 2008/35773 A1 | | 3/2008 |

OTHER PUBLICATIONS

"SCR of NO By NH3 over TiO2-supported V2O5-MoO3 catalysts: reactivity and redox behavior," Laura Casagrande et al. Applied Catalysis B: Environmental 22 (1999), pp. 63-77.*

"Characterization and reactivity of TiO2-supported MoO3 De-Nox SCR catalysts," I. Nova et al. Applied Catalysis B: Environmental 17 (1998), pp. 245-258.*

Mercury oxidation by hydrochloric acid over TiO2 supported metal oxide catalysts in coal combustion flue gas, Hiroyuki Kamata et al. Fuel Processing Technology 90 (2009), pp. 947-951.*

International Search Report of PCT/JP2010/067132, date of mailing Nov. 22, 2010.

Hiroyuki et al.; "Sankabutsu-Shokubaijyo deno Gasujyo-Suigin no Sankahannou"; 98th_Shokubaitouronkai, p. 263. (with Applicants' Concise Statement of Relevance).

English translation of International Search Report of PCT/JP2010/067132, date of mailing Nov. 22, 2010.

English Translation of International Preliminary Report on Patentability of PCT/JP2010/067132, date of mailing May 18, 2012.

* cited by examiner

MERCURY OXIDATION CATALYST AND METHOD FOR PRODUCING THE SAME

CROSS REFERENCE TO RELATED APPLICATION

This application claims priority from U.S. provisional patent application Ser. No. 61/247,716, filed on Oct. 1, 2009, the disclosure of which is incorporated herein by reference.

BACKGROUND OF THE INVENTION

The present invention relates to a mercury oxidation catalyst and to a method of producing the same.

Conventionally, mercury present in a flue gas is thought to contain mercury metal that is insoluble in water and mercury compounds that are soluble in water. If the mercury metal can be converted into mercury compounds in the presence of a catalyst, such as a denitration catalyst, the mercury compounds can be removed by downstream desulfurization equipment (for example, refer to JP 10-230137 A).

The inventors have been diligently carrying out ongoing research on such a mercury oxidation catalyst as described above which functions as a denitrification catalyst and is capable of converting mercury metal into a water-soluble mercury compound.

The present invention relates to a novel mercury oxidation catalyst developed under these circumstances and to a method of producing the same.

SUMMARY OF THE INVENTION

An object of the present invention is to provide a novel highly durable and stable mercury oxidation catalyst which contains $V_2O_5$ and $MoO_3$ as active components, and is capable of preventing volatilization of $MoO_3$ in the mercury oxidation catalyst, and to provide a method of producing the mercury oxidation catalyst.

To solve the above problems, the present invention provides a mercury oxidation catalyst oxidizing mercury in an exhaust gas into a mercury compound, the mercury oxidation catalyst including: $TiO_2$ as a carrier; $V_2O_5$ and $MoO_3$ supported on the carrier as active components; and at least one element or compound selected from the group consisting of W, Cu, Co, Ni, Zn, and the compounds thereof supported on the carrier as a $MoO_3$ volatilization preventing component.

The present invention provides a method of producing a mercury oxidation catalyst for oxidizing mercury in an exhaust gas into a mercury compound, the method including the steps of: preparing a catalyst material solution A containing $MoO_3$ to serve as an active component and a $MoO_3$ volatilization preventing component; supporting catalyst components in the catalyst material solution A on a $TiO_2$ carrier; drying and calcining the carrier having been subjected to the step of supporting catalyst components in the catalyst material solution A on the carrier; preparing a catalyst material solution B containing $V_2O_5$ to serve as an active component; supporting catalyst components in the catalyst material solution B on the carrier having been calcined previously; and drying and calcining the carrier having been subjected to the step of supporting catalyst component in the catalyst material solution B on the carrier.

In an aspect of the method of producing a mercury oxidation catalyst according to the present invention, the $MoO_3$ volatilization preventing component is at least one kind of element or compound selected from the group consisting of W, Cu, Co, Ni, Zn, and compounds thereof.

The present invention provides a novel highly durable mercury oxidation catalyst which contains $V_2O_5$ and $MoO_3$ as active components, and is capable of preventing volatilization of $MoO_3$ in the mercury oxidation catalyst, and a method of producing the mercury oxidation catalyst.

DETAILED DESCRIPTION OF PREFERRED EMBODIMENT

Figure 1:
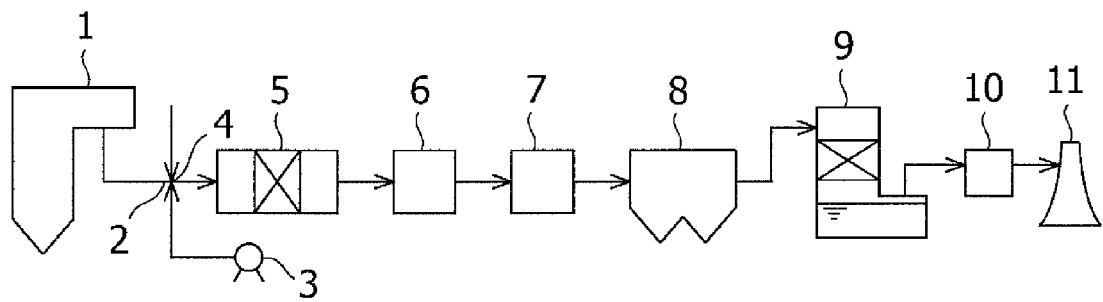
FIG. 1 is a conceptual diagram describing an embodiment of a flue gas processing system adopting a mercury oxidation catalyst according to the present invention.

Hereinafter, a mercury oxidation catalyst and a method of production therefor according to the present invention will be described in further detail by referring to the attached drawings.

A mercury oxidation catalyst according to the present invention is a mercury oxidation catalyst oxidizing mercury metal in an exhaust gas to a mercury compound.

The mercury oxidation catalyst according to the present invention comprises: $TiO_2$ as a carrier; $V_2O_5$ and $MoO_3$ supported on the carrier as active components; and at least one kind of element or compound selected from the group consisting of W, Cu, Co, Ni, Zn, and the compounds thereof supported on the carrier as a $MoO_3$ volatilization preventing component.

The fact that W, Cu, Co, Ni, Zn, and compounds thereof are suitable as $MoO_3$ volatilization preventing components has been discovered as a result of the research diligently carried out by the present inventors, and the effect will be further shown in Examples below. In addition to these, a solid soluble component on a phase diagram can also be listed as a volatilization preventing component.

In one example of production of a mercury oxidation catalyst according to the present invention, firstly, a catalyst material solution containing active components and a $MoO_3$ volatilization preventing component is prepared.

Thereafter, a substrate containing a $TiO_2$ carrier is soaked into the catalyst material solution so as to be impregnated with the catalyst material solution, then dried, and calcined.

Note that the substrate containing a $TiO_2$ carrier is produced in, for example, extrusion molding.

Subsequently, the substrate is soaked into the catalyst material solution again and the substrate impregnated with the catalyst material solution is dried and calcined.

As described above, a target mercury oxidation catalyst can be obtained.

However, in order to further preferably prevent volatilization of $MoO_3$, firstly, a catalyst material solution A containing $MoO_3$ to serve as an active component and a $MoO_3$ volatilization preventing component is prepared.

Thereafter, a substrate containing $TiO_2$ is soaked in the catalyst material solution A so as to be impregnated with the catalyst material solution A.

Subsequently, the substrate having been soaked in the catalyst material solution A is dried and calcined.

Meanwhile, a catalyst material solution B containing $V_2O_5$ to serve as another active component is prepared.

Furthermore, the substrate calcined as above is soaked in the above-described catalyst material solution B so as to be impregnated with the catalyst material solution B.

Lastly, the substrate having been subjected to the step of impregnating with the catalyst material solution B is dried and calcined.

By thus adding $V_2O_5$ after the step of calcining above, it is possible to obtain a target mercury oxidation catalyst which further prevents volatilization of $MoO_3$. This has been discovered as a result of the studies diligently carried out by the present inventors, and the effects will be further shown in Examples below. Here, the substrate impregnated with the vanadium material may be dried and filled in a denitrating apparatus without calcination and thereafter calcined in the denitrating apparatus at the operation temperature thereof.

The composition ratio of the mercury oxidation catalyst according to the present invention is not particularly limited. As one example, a composition is preferable in which active components ($V_2O_5$ and $MoO_3$) in terms of their oxides are 0.1 to 20 parts by weight with respect to 100 parts by weight of the $TiO_2$ carrier. In respect to the $MoO_3$ volatilization preventing component, a composition is preferable in which it is 0.06 to 50 parts by weight with respect to 1 part by weight of $MoO_3$.

Furthermore, in the mercury oxidation catalyst according to the present invention, any shape can be selected for the substrate in accordance with a system configuration, and may be, for example, any integrally-molded shape, such as a pellet shape, a plate shape, a cylinder shape, a corrugated shape, and a honeycomb shape. In regard to the honeycomb shape, both an extrusion molded type and a coated type are acceptable.

A coating of the mercury oxidation catalyst of the present invention may be applied to an extrusion-molded honeycomb substrate, where a regeneration catalyst may be coated by the regeneration process described in JP 2009-226388 A.

Alternatively, the catalyst may also be produced by a kneading method. For example, instead of impregnating a honeycomb made of titanium dioxide with an active component, such methods may be adopted that a molybdenum raw material, a tungsten raw material, and a vanadium raw material together with titanium dioxide, a titanium dioxide raw material, or the like are kneaded together and then extruded.

Other types of methods may also be adopted in which a molybdenum raw material and a tungsten raw material together with titanium dioxide, a titanium dioxide raw material, or the like are extruded, then subjected to processing, such as drying, calcination, and grinding, as necessary, and thereafter kneaded with a vanadium raw material or the like and then extruded. The extruded material may be dried and filled in a denitrating apparatus without calcinations and thereafter calcined in the denitrating apparatus at the operation temperature thereof.

As a V (vanadium) raw material, which is one of the active components, vanadium dioxide, vanadyl oxalate, vanadyl sulfate, ammonium metavanadate, and the like may be used.

As a Mo (molybdenum) raw material, which is the other one of the active components, salts, such as ammonium molybdate and sodium molybdate, in addition to molybdenum trioxide, may be used.

Among the $MoO_3$ volatilization preventing components, as a W (tungsten) raw material, salts, such as ammonium para-tungstate and ammonium meta-tungstate may be used. In addition, copper nitrate, copper acetate, copper hydroxide, and the like may be used as a Cu (copper) raw material; cobalt nitrate, cobalt acetate, basic cobalt carbonate, and the like may be used as a Co (cobalt) raw material; nickel nitrate, nickel acetate, basic nickel carbonate, and the like may be used as a Ni (nickel) raw material; and zinc nitrate, basic zinc carbonate, and the like may be used as a Zn (zinc) raw material.

A solution of the active component and a solution of the $MoO_3$ volatilization preventing component may be prepared by respectively dissolving the active component and the $MoO_3$ volatilization preventing component into a publicly-known solvent.

Next, an embodiment of a flue gas processing system adopting the mercury oxidation catalyst according to the present invention will be described by use of FIG. 1.

Exhaust gas to be treated in the present invention is, for example, a boiler exhaust gas from a thermal power station, factory, or the like in which fuels, such as coal and heavy oil, containing sulfur, mercury, and the like are burnt, and a heating furnace exhaust gas from a metal plant, petroleum refining plant, petrochemical plant, or the like, and the exhaust gas has a low concentration of $NO_x$, contains carbon dioxide, oxygen, $SO_x$, and dust or moisture, and is large in the amount of emission thereof.

In FIG. 1, in a flow path from a boiler 1 to reducing denitration equipment 5, an ammonia injector 2 which injects $NH_3$ supplied from an ammonia tank 3 into an exhaust gas and an HCl injector 4 are provided.

An exhaust gas from the boiler 1 is guided into the reducing denitration equipment 5. With the exhaust gas into which $NH_3$ and HCl have been injected, in the reducing denitration equipment 5, a reaction between $NH_3$ and $NO_x$ is carried out while metal Hg is oxidized to $HgCl_2$ in the presence of HCl.

Reactions proceeding here are as shown below.

$$Hg + 2HCl + 1/2 O_2 \rightarrow HgCl_2 + H_2O \quad (1)$$

$$HgCl_2 + NH_3 + 1/4 O_2 \rightarrow Hg + 1/2 N_2 + 2HCl + 1/2 H_2O \quad (2)$$

$$4NO + 4NH_3 + O_2 \rightarrow 4N_2 + 6H_2O \quad (3)$$

$$HgCl_2 + SO_2 + H_2O \rightarrow Hg + 2HCl + SO_3 \quad (4)$$

$$HgCl_2 + CO + H_2O \rightarrow Hg + 2HCl + CO_2 \quad (5)$$

$$HgCl_2 + HC\ (ex.\ HCHO,\ C_2H_4,\ C_6H_6) + H_2O + O_2 \rightarrow Hg + 2HCl + CO_2 \quad (6)$$

$$HC + O_2 \rightarrow CO,\ CO_2 + H_2O \quad (7)$$

$$2NH_3 + 3/2 O_2 \rightarrow N_2 + 3H_2O \quad (8)$$

In the treatment in the reducing denitration equipment 5, if the catalyst for oxidation of mercury according to the present invention is adopted, the active component $MoO_3$ is conjugated with the $MoO_3$ volatilization preventing component, thereby being capable of preventing volatilization of $MoO_3$. Accordingly, the durability is improved.

Note that in the series of the above-described reactions, the mercury oxidation reaction by the denitration catalyst is inhibited by unburned portions (CO, HC) of coal (equations 5 and 6). However, by imparting an HC oxidation function further to the denitration catalyst having a mercury oxidation function, such an inhibitory effect against the mercury oxidation reaction can be further reduced.

An oxidizing agent used for oxidization of mercury metal to promote the above reactions may be HCl, HBr, or the like. The amount of the oxidizing agent to be added is very small. Accordingly, in some cases, there is no need to newly add an oxidizing agent.

Specifically, for example, in the case in which a metal mercury oxidation agent, such as HCl, derived from coal is contained in the exhaust gas in an amount of several tens of ppm, installation of a device for spraying a metal mercury oxidation agent, such as HCl, is not necessary. In such a case, installation costs for safety management measures on the metal mercury oxidation agents, such as HCl, which require care in handling, can be significantly reduced.

Note that, as the mercury oxidation agent, other than HCl, any one may be used as long as it reacts with mercury contained in the exhaust gas to generate a water-soluble mercury compound.

For example, in addition to HCl, halogen compounds, such as ammonium chloride, chlorine, hypochlorous acid, ammonium hypochlorite, chlorite, ammonium chlorite, chloric acid, ammonium chlorate, perchloric acid, ammonium perchlorate, and bromine, amine salts of the above-described acids, other salts, and the like may be used.

The amount of the mercury oxidation agent added to the exhaust gas should be a stoichiometric amount or more with respect to poorly-water soluble mercury, such as mercury metal. When coal or heavy oil is used as a fuel, the concentration of the mercury oxidation agent added to the exhaust gas is 1000 ppm or less in the case of hydrogen chloride, and is approximately 1 to 300 ppm in practice. The adding of HCl may be achieved by using hydrogen chloride in the form of an agent or using hydrochloric acid. In regard to hydrochloric acid, the concentration is not particularly limited; and, for example, examples thereof range from concentrated hydrochloric acid to dilute hydrochloric acid of approximately 5%. As a device for adding HCl to the exhaust gas, conventionally-available chemical metering pumps and spray nozzles may be used. For addition of the salts, such as ammonium chloride, it is preferable to use a solution of the salts. The addition of the mercury oxidation agent may be before or after the addition of ammonia to the exhaust gas.

After the treatment in the reducing denitration equipment 5, the exhaust gas goes through an air preheater 6 and a heat exchanger 7, is subjected to removal of dust in an electric dust collector 8, and is then subjected to removal of $SO_2$ in the exhaust gas as well as removal of mercury compounds in wet desulfurization equipment 9. The exhaust gas coming out from the reducing denitration equipment contains an excessive amount of the mercury metal oxidation agent, such as HCl; however, it will not be discharged from a chimney as being absorbed into an alkaline solution in the desulfurization equipment.

In the configuration in FIG. 1, in the exhaust gas treatment in which $NO_x$ in the exhaust gas is removed by the reducing denitration equipment and $SO_2$ in the exhaust gas is removed by the wet desulfurization equipment having an alkaline absorbing solution as an absorbent, the mercury oxidation agent is to be added to the upstream of the denitration equipment. However, $NH_3$ is only needed for denitration; thus, even without the addition of $NH_3$ to the upstream of the reducing denitration equipment, there is still the same effect of being capable of converting mercury to its chloride by the mercury oxidation agent in the presence of the catalyst of the reducing denitration equipment and then removing the mercury compound in the wet desulfurization equipment.

WORKING EXAMPLES

Example 1

Test for Prevention of Volatilization of Mo

A $TiO_2$ carrier was formed into a honeycomb shape, and the resultant was calcined to prepare a substrate containing the $TiO_2$ carrier. Then, this base material was soaked in each of the following mixed solutions (Test Examples 1 to 6), dried, and thereafter calcined at 500° C. for 3 hours to obtain a honeycomb catalyst.

Test Example 1

24.94 g of ammonium molybdate was dissolved in 100 g of water.

Test Example 2

A solution was prepared so that 100 g of 40 wt % methylamine solution may contain 28.477 g of ammonium molybdate and 26.191 g of ammonium paratungstate.

Test Example 3

A solution was prepared so that 100 g of 40 wt % methylamine solution may contain 27.95 g of ammonium molybdate and 15.95 g of copper hydroxide.

Test Example 4

A solution was prepared so that 100 g of water may contain 24.821 g of ammonium molybdate and 41.607 g of cobalt nitrate.

Test Example 5

A solution was prepared so that 100 g of water may contain 25.639 g of ammonium molybdate and 79.223 g of nickel nitrate.

Test Example 6

A solution was prepared so that 100 g of water may contain 24.828 g of ammonium molybdate and 42.347 g of zinc nitrate.

Honeycomb catalysts of Test Examples 1 to 6 were exposed under the circulation of a simulant gas at 550° C. for 8 hours, and the concentrations of $MoO_3$ before and after the treatment were compared to calculate a percentage of $MoO_3$ volatilized.

The results are shown in Table 1 below.

Composition of the Simulant Gas:
$O_2$ 3% vol dry, $CO_2$ 10% vol dry, $H_2O$ 10% wet, $SO_2$ 500 ppm dry, $N_2$ for the rest

TABLE 1

| Test Example | $MoO_3$ (wt %) before exposure | $MoO_3$ (wt %) after exposure | Percentage of $MoO_3$ volatilized (wt %) |
| --- | --- | --- | --- |
| 1 | 7.23 | 5.71 | 21.0 |
| 2 | 6.85 | 6.07 | 11.4 |
| 3 | 7.03 | 6.27 | 10.8 |
| 4 | 5.6 | 5.16 | 7.9 |
| 5 | 4.67 | 4.49 | 3.9 |
| 6 | 5.46 | 5.01 | 8.2 |

As may be understood from Table 1, with respect to Test Example 1 containing no component for preventing volatilization of $MoO_3$, all Test Examples 2 to 6 containing any one of W, Cu, Co, Ni, and Zn had volatilization of $MoO_3$ prevented. In other words, it is understood that these components function as $MoO_3$ volatilization preventing components.

Example 2

Verification for Production Method

Test Example 7

A $TiO_2$ carrier was formed into a honeycomb shape, and it was then calcined to prepare a substrate containing the $TiO_2$ carrier.

Then, a solution was prepared in which 19.636 g of ammonium molybdate and 1.478 g of ammonium metavanadate were dissolved in 80 g of water.

The honeycomb base material was soaked in the catalyst material solution, dried, and then calcined at 500° C. for 3 hours.

An obtained honeycomb catalyst was exposed under the circulation of a simulant gas at 550° C. for 8 hours, and the concentrations of $MoO_3$ before and after the treatment were compared to calculate a percentage of $MoO_3$ volatilized. The percentage of $MoO_3$ was 18.4 wt %.

Test Example 8

Next, a solution was prepared in which 22.569 g of ammonium molybdate, 20.697 g of ammonium paratungstate, and 1.685 g of ammonium metavanadate were dissolved in 80 g of 40 wt % methylamine solution.

The honeycomb substrate was soaked in the catalyst material solution, dried, and thereafter calcined at 500° C. for 3 hours.

An obtained honeycomb catalyst was exposed under the circulation of a simulant gas at 550° C. for 8 hours, and the concentrations of $MoO_3$ before and after the treatment were compared to calculate a percentage of $MoO_3$ sublimed. The percentage of $MoO_3$ sublimed was 16.7 wt %.

As described above, the percentage of volatilization slightly decreased.

This did not agree with the result obtained in Example 1; therefore, some sort of cause due to the addition of V (vanadium) was assumed. Regarding this, the present inventors diligently carried out ongoing research.

As a result, it was found that a target mercury oxidation catalyst in which volatilization of $MoO_3$ is further prevented could be obtained by adding V (vanadium) after the preceding step of calcining than that of the complex oxide of Mo and V. This was also verified in Test Example 9 carried out in the following process. Furthermore, since V (vanadium) is the main component in a denitration process, the content thereof would preferably be independently adjusted in a sensitive manner. As has been mentioned, the effect of the addition of V has been reduced in accordance with the present invention, which is entirely different from the invention in Japanese Patent Application 2006-256639.

Test Example 9

A solution was prepared in which 21.677 g of ammonium molybdate and 19.903 g of ammonium paratungstate were dissolved in 80 g of 40 wt % methylamine solution, and furthermore a solution was prepared in which 3.347 g of vanadyl sulfate was dissolved in 80 g of water.

A mixed solution of the solution of ammonium molybdate and the solution of ammonium paratungstate was used as a catalyst material solution A.

The honeycomb substrate was soaked in the catalyst material solution A, and then calcined at 500° C. for 3 hours.

Thereafter, this substrate was soaked in the solution of vanadyl sulfate (catalyst material solution B), and then calcined at 500° C. for 3 hours.

An obtained honeycomb catalyst was exposed under the circulation of a simulant gas at 550° C. for 8 hours, and the concentrations of $MoO_3$ before and after the treatment were compared to calculate a percentage of $MoO_3$ volatilized. The percentage of $MoO_3$ volatilized was 12.1 wt %.

This result agreed with the result of Example 1 above, and the drawback involved in the addition of V (vanadium) had been overcome.

Note that the composition of the simulant gas used in Test Examples 7 to 9 was the same as that in Example 1.

Example 3

Figure 2:
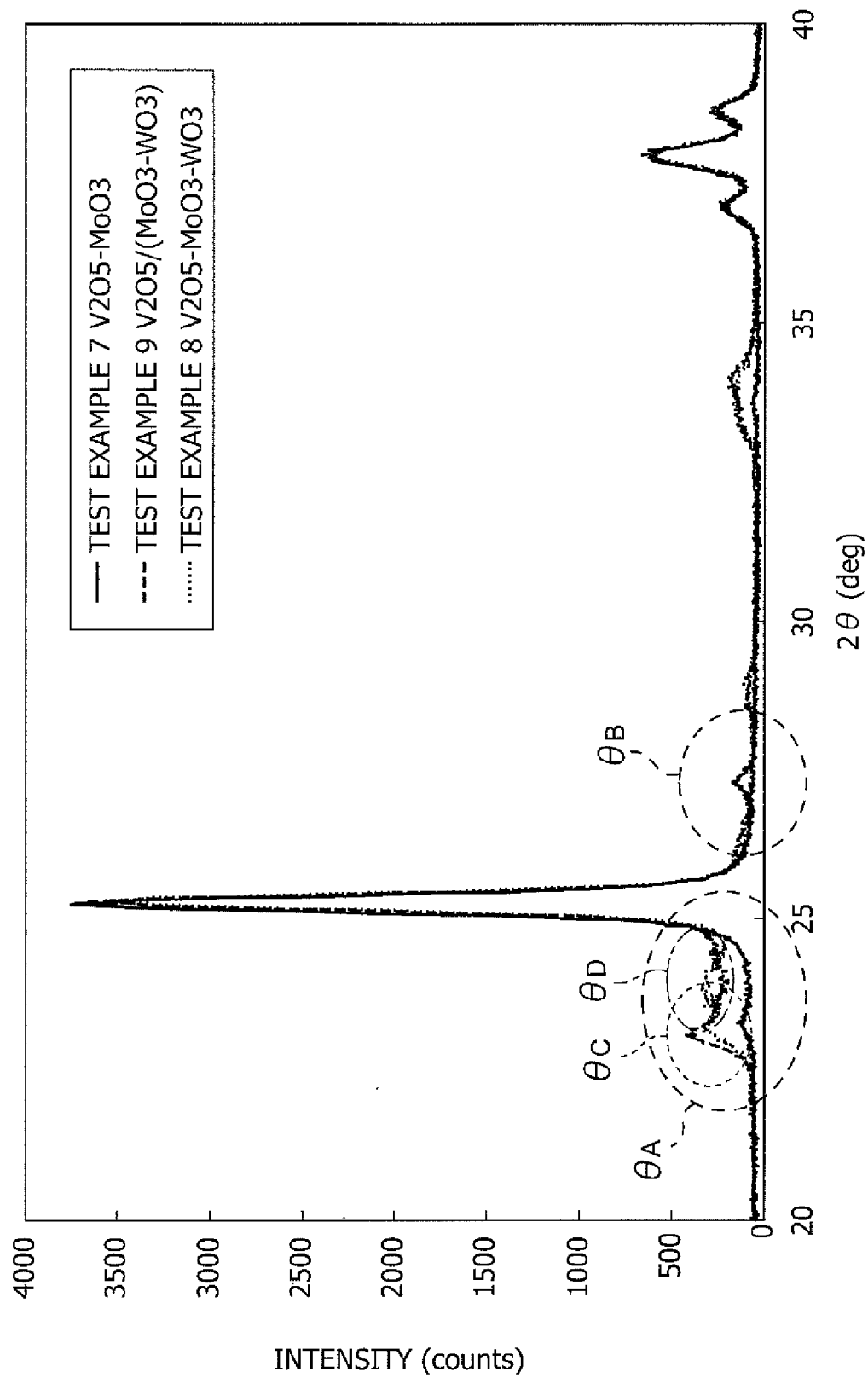
FIG. 2 is a graph showing results of powder XRD analyses performed on honeycomb catalysts ground according to Test Examples 7 to 9.
Figure 3:
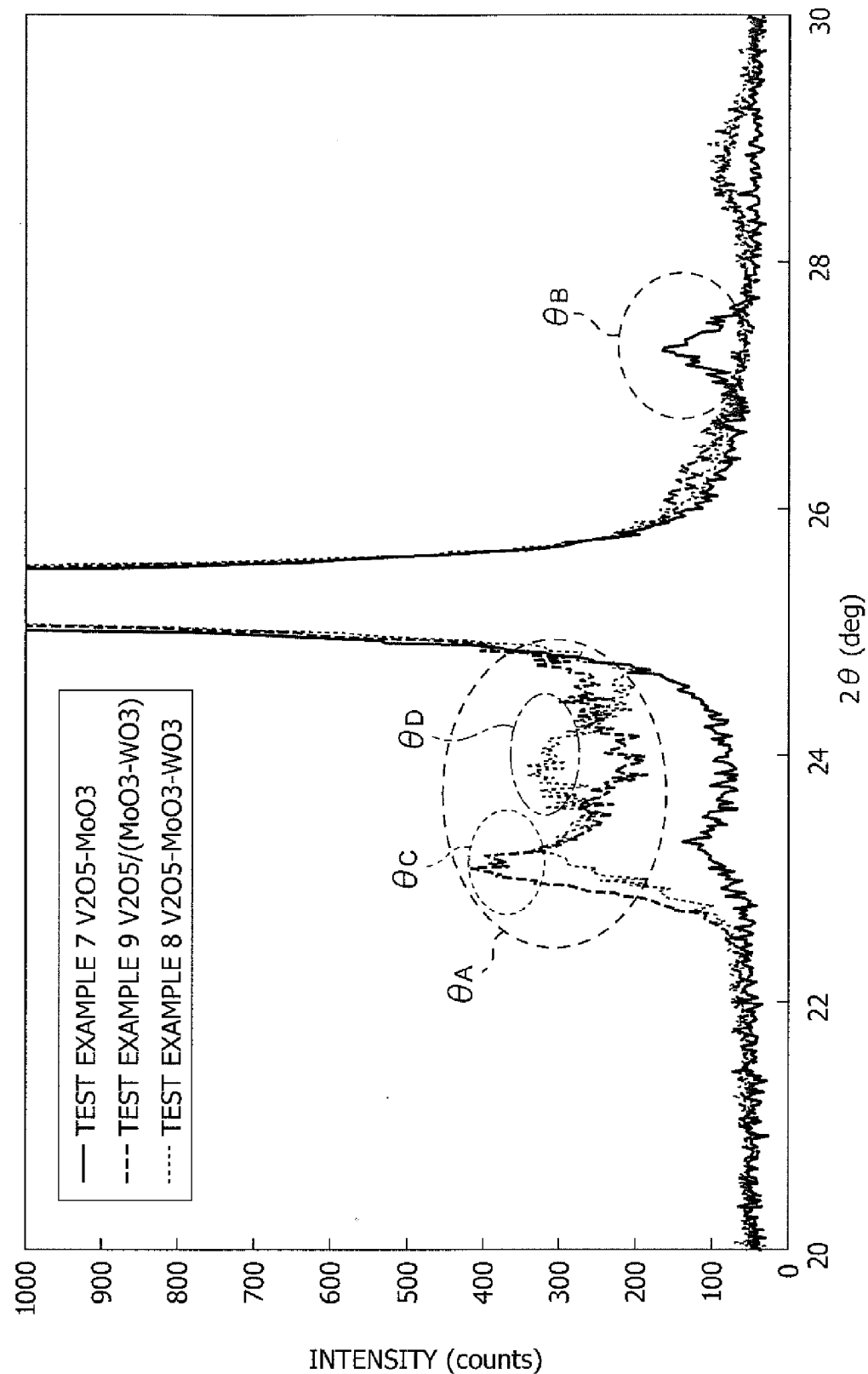
FIG. 3 is a graph showing a part of FIG. 2 in close-up.

The results of XRD analysis performed on the honeycomb catalysts obtained in Test Examples 7 to 9 above are shown in FIG. 2 and FIG. 3.

A region $\theta_A$ is a region in which a characteristic of $WO_3$ or a complex oxide of $WO_3$ and $MoO_3$ is to appear.

A region $\theta_B$ is a region in which a characteristic of $MoO_3$ is to appear.

In both Test Examples 8 and 9, a peak related to $WO_3$ appears (in a sub-region $\theta_C$).

However, although a peak appears in the region which is considered to be for the complex oxide of $WO_3$ and $MoO_3$ in Test Example 8, such a peak does not appear in Test Example 9 (in a sub-region $\theta_D$).

Furthermore, although a peak of $MoO_3$ appears in Test Example 7, no such peak appears in Test Examples 8 and 9 (in the region $\theta_B$).

From these results, it is understood that, in Test Example 9, generation of the complex oxide of $WO_3$ and $MoO_3$ is small, and $MoO_3$ is preferably dissolved into crystallized $WO_3$ in a solid solution. In other words, it is understood that a reason is suggested why the method of production including soaking in the catalyst material solution A and soaking in the catalyst material solution B carried out respectively in two stages is superior. This proves that the method with the two steps is excellent, in which one step of soaking is performed in the catalyst material solution A and the other subsequent step of soaking is performed in the catalyst material solution B.

There is no $MoO_3$ peak in the range between 27-28 deg ($2\theta$) (in the region $\theta_B$); and there are some peaks of $MoO_3$ volatilization preventing component or the complex oxide of MoO3 and $MoO_3$ volatilization preventing component in the range between 22-25 deg ($2\theta$) (in the region $\theta_A$) by XRD analysis in Example 9. Furthermore, the XRD peaks of the region $\theta_A$ may fluctuate depending on the conditions of drying or calcination, but no $MoO_3$ related peak will appear in the region $\theta_B$.

Example 4

Figure 4:
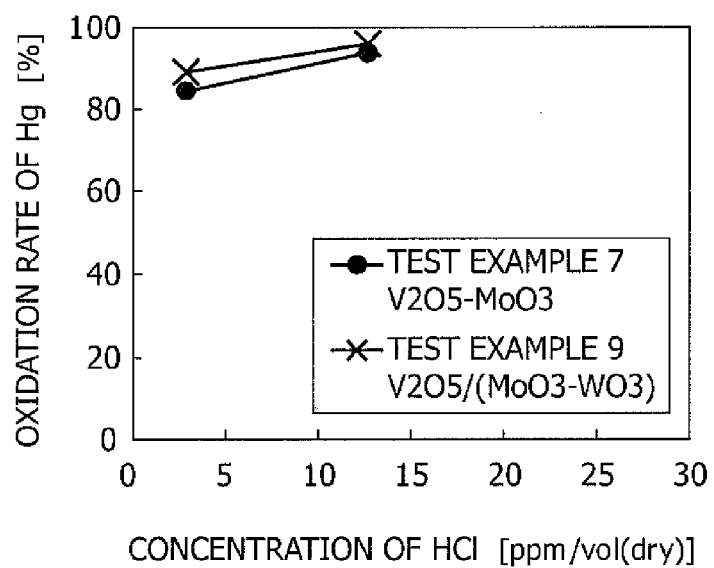
FIG. 4 is a graph showing activity of the honeycomb catalyst according to Test Example 9.

The oxidation rate of Hg in the honeycomb catalyst according to Test Example 9 is shown in FIG. 4.

The horizontal axis indicates the concentration of HCl in the simulant exhaust gas on a dry basis. It is understood that the oxidizing capability itself is comparable to that of the honeycomb catalyst of Test Example 7 used as a reference. It should be noted that the present inventors verified that the oxidizing capability of the honeycomb catalyst according to Test Example 7 is superior to those of conventional ones.

Conditions for activity evaluation are shown as in Table 2.

TABLE 2

Conditions for Activity Evaluation

| | | Unit | Numerical Value |
|---|---|---|---|
| Test conditions | Temperature | ° C. | 350 |
| | NOx | ppm vol dry | 370 |
| | $O_2$ | % vol dry | 3 |
| | SOx | ppm vol dry | 480 |
| | $H_2O$ | % vol wet | 13 |
| | $NH_3/NOx$ | — | 0 |
| | Hg | $mg/m^3N$ | 80 |

Furthermore, the results under the conditions of coexistence of $NH_3$ are shown in Table 4 (refer to Table 3 for the test conditions). It has been verified that the oxidizing capability of the catalyst of Test Example 9 is equivalent to the oxidizing capability of the catalyst of Test Example 7. Furthermore, it has been revealed that the oxidizing capability itself is low in a catalyst obtained by impregnating a catalyst containing vanadium and tungsten in molybdenum (Test Example 11); thus, the effectiveness of the present invention in respect to the method of production has been verified.

It should be noted that, however, in the case, for example, in which the catalyst produced in Test Example 10 is used as the honeycomb substrate in Test Example 11 or as the honeycomb substrate in Test Example 9, the oxidizing capability may be demonstrated if the amounts of $V_2O_5$ and $WO_3$ produced in Test Example 10 are very small.

TABLE 3

Conditions for Activity Evaluation

| | | Unit | Numerical Value |
|---|---|---|---|
| Test conditions | Temperature | ° C. | 400 |
| | NOx | ppm vol dry | 350 |
| | $O_2$ | % vol dry | 4 |
| | SOx | ppm vol dry | 1000 |
| | $H_2O$ | % vol wet | 13 |
| | $NH_3/NOx$ | — | 0.9 |
| | Hg | $Mg/m^3N$ | 20 |
| | HCl | ppm vol dry | 50 |

TABLE 4

| Test Example | Oxidation rate of Hg (%) |
|---|---|
| 1 | 95 |
| 9 | 95 |
| 10 | 82 |
| 11 | 82 |

Test Example 10

A catalyst containing vanadium and tungsten was prepared as described below.

A solution of ammonium metavanadate and a solution of ammonium tungstate were added to a powder of titanium dioxide so as to be 0.5% by weight in terms of $V_2O_5$ and 0.3% by weight in terms of $WO_3$, respectively, and a resultant mixture was sufficiently mixed, then dried, and calcined at 450° C. for 4 hours so as to obtain a powder (A) made of titanium oxide [$TiO_2$]-vanadium oxide [$V_2O_5$]-molybdenum oxide [$WO_3$]. 1000 g of the powder (A), 25 g of carboxymethyl cellulose, and 12.5 g of polyethylene oxide were together put into a kneader, kneaded for 30 minutes with an appropriate amount of water having been added thereto, molded into a honeycomb shape by extrusion, and calcined at 500° C. for 5 hours after being dried, thereby preparing a $WO_3$ (3)-$V_2O_5$ (0.5)/$TiO_2$ catalyst.

Test Example 11

The catalyst prepared in Test Example 10 was soaked in a solution of ammonium molybdenum, dried, and calcined, thereby preparing $MoO_3$ (7)-$WO_3$ (3)-$V_2O_5$ (0.5)/$TiO_2$ catalyst.

What is claimed is:

1. A mercury oxidation catalyst for oxidizing mercury in an exhaust gas into a water-soluble mercury compound, the mercury oxidation catalyst comprising:
   $TiO_2$ as a carrier;
   $V_2O_5$ and $MoO_3$ supported on the carrier as active components;
   at least one kind of element or compound selected from the group consisting of W, Cu, Co, Ni, Zn, or the compounds thereof supported on the carrier as a $MoO_3$ volatilization preventing component; and, the mercury oxidation catalyst being formed by,
   preparing a catalyst material solution A containing the $MoO_3$ to serve as a first active component and the $MoO_3$ volatilization preventing component;
   supporting catalyst components in the catalyst material solution A on a substrate containing the $TiO_2$ carrier;
   drying and calcining the substrate having been subjected to the step of supporting catalyst components in the catalyst material solution A;
   preparing a catalyst material solution B containing the $V_2O_5$ to serve as a second active component;
   supporting catalyst component in the catalyst material solution B on the carrier having been calcined previously; and
   drying and calcining the carrier having been subjected to the step of supporting catalyst component in the catalyst material solution B on the carrier.

2. A mercury oxidation catalyst for oxidizing mercury in an exhaust gas into a water-soluble mercury compound, the mercury oxidation catalyst comprising:
   $TiO_2$ as a carrier;
   $V_2O_5$ and $MoO_3$ supported on the carrier as active components; and
   at least one kind of element or compound selected from the group consisting of W, Cu, Co, Ni, Zn, or the compounds thereof supported on the carrier as a $MoO_3$ volatilization preventing component;
   there is no $MoO_3$ peak by XRD analysis; and, the mercury oxidation catalyst being formed by,
   preparing a catalyst material solution A containing the $MoO_3$ to serve as a first active component and the $MoO_3$ volatilization preventing component;
   supporting catalyst components in the catalyst material solution A on a substrate containing the $TiO_2$ carrier;
   drying and calcining the substrate having been subjected to the step of supporting catalyst components in the catalyst material solution A;
   preparing a catalyst material solution B containing the $V_2O_5$ to serve as a second active component;

supporting catalyst component in the catalyst material solution B on the carrier having been calcined previously; and drying and calcining the carrier having been subjected to the step of supporting catalyst component in the catalyst material solution B on the carrier.

3. A method of producing a mercury oxidation catalyst oxidizing mercury in an exhaust gas into a water-soluble mercury compound, the method comprising the steps of:

preparing a catalyst material solution A containing $MoO_3$ to serve as an active component and a $MoO_3$ volatilization preventing component;

supporting catalyst components in the catalyst material solution A on a $TiO_2$ carrier;

drying and calcining the carrier having been subjected to the step of supporting catalyst components in the catalyst material solution A on the carrier;

preparing a catalyst material solution B containing $V_2O_5$ to serve as an active component;

supporting catalyst component in the catalyst material solution B on the carrier having been calcined previously; and drying and calcining the carrier having been subjected to the step of supporting catalyst component in the catalyst material solution B on the carrier.

4. The method of producing a mercury oxidation catalyst according to claim 3, wherein the $MoO_3$ volatilization preventing component is at least one kind of element or compound selected from the group consisting of W, Cu, Co, Ni, Zn, and compounds thereof.

* * * * *